C. LONG.
DRINKING FOUNTAIN FOR LIVE STOCK.
APPLICATION FILED JUNE 5, 1922.
1,438,770.
Patented Dec. 12, 1922.
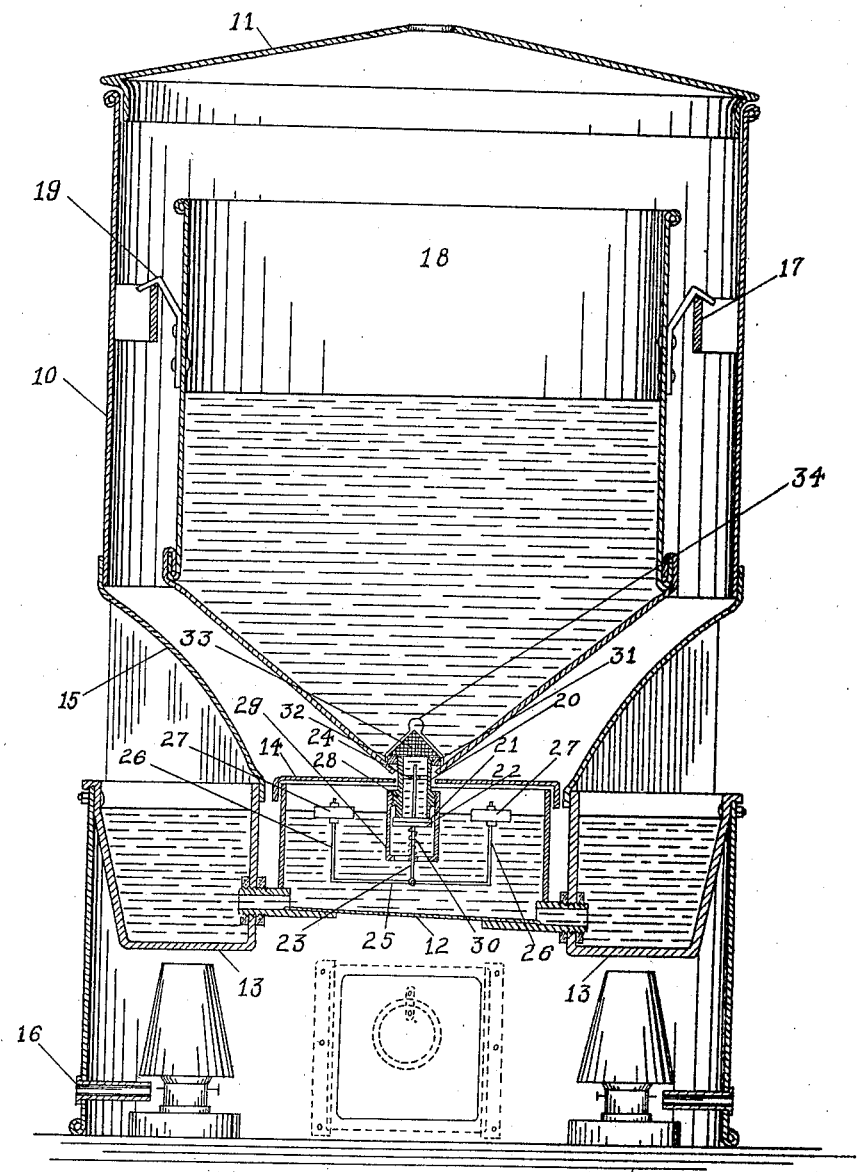
Charlie Long INVENTOR.
BY
*Emil F. Lange* ATTORNEY Patented Dec. 12, 1922.

1,438,770

UNITED STATES PATENT OFFICE.

CHARLIE LONG, OF LINCOLN, NEBRASKA.

DRINKING FOUNTAIN FOR LIVE STOCK.

Application filed June 5, 1922. Serial No. 565,859.

*To all whom it may concern:*

Be it known that I, CHARLIE LONG, a citizen of the United States, residing at Lincoln, in the county of Lancaster and State of Nebraska, have invented certain new and useful Improvements in Drinking Fountains for Live Stock, of which the following is a specification.

My invention relates to drinking fountains for live stock which is especially adapted for the purpose of furnishing a constant supply of drinking water in sanitary condition to hogs, my present invention resembling more particularly the one disclosed in my prior application Number 542,678, filed March 10, 1922.

The fountains at present on the market are all open to serious objections. Water trickling on the surface of the ground is immediately taken advantage of by the animals to root and to undermine the fountain, thus leaving the surroundings foul and in unsanitary condition. When refilling these fountains, it is necessary to close the outlet valve at the bottom by kneeling in the mud or snow. My object is to avoid these objectionable features, and at the same time to provide features which permit filling of the fountain from the top without stooping, to thoroughly strain and filter the water before it is delivered to the stock, to prevent the entrance of trash after the water has passed through the filter, and to prevent disturbance by gusts of wind of the mechanism for regulating the flow of water. Other objects will appear in the description.

The figure in the drawing is a vertical median sectional view of my drinking fountain.

The entire outer casing and the drinking cups and heating and ventilating arrangements here shown and described are identical with those in the aforementioned application and are here referred to only because of their bearing on my present invention. It is my purpose to manufacture one type of outer casing and to standardize the interior reservoirs disclosed in my present application and in application #542,678 so that either interior reservoir may be supplied with the outer casing.

The outer casing is in the form of an upright cylinder 10 having a lid 11 tightly closing the top opening. The lid is provided with just sufficient openings to permit the escape of the gases produced by the combustion in the heating arrangements. The upper and lower edges of the cylinder 10 are reinforced by iron hoops with the edges of the sheet metal rolled over the hoops, this structure being designed to strengthen the cylinder so that it will withstand the rough usage incident to its use in the hog lot. At diametrically opposite points in the casing and at a suitable height above the bottom I cut openings and between the openings I mount an arrangement consisting of a central trough having an inclined bottom 12, the trough being connected to drinking cups 13. The drinking cups 13 are secured at their edges to the outer casing, and the upper and open surface of the trough is provided with a lid 14. The openings are backed by the walls 15 to entirely prevent access to the interior on the part of the hogs. Underneath each drinking cup I place a lamp as shown, to prevent freezing in cold weather, and to provide a constant supply of fresh air to the lamps without permitting access by the hogs, I secure the air supply pipes 16 to the casing. Near the lamps is a small sliding door with a small sized ring on its outside. Near the upper end of the casing and secured to the casing are loops 17 for supporting the inner reservoir. Thus far the structure is identical with that shown in my prior application, and is described here for the purpose of clearly showing how my present invention is to be used.

The water reservoir 18 is open at the top and has a sloping bottom. I prefer to make the bottom of funnel form but I do not desire to limit myself to this form. At the sides of the reservoir I secure hooks 19 which are adapted to be hooked into the loops 17 to support the reservoir from the sides of the outer casing. These hooks are identical with those shown and described in my prior application and similarly placed, so that either reservoir may be mounted in the same outer casing.

The lower extremity of the bottom is open and is provided with a cylindrical outlet 20. The rubber washer 21 backed by the metal washer 22 serves in conjunction with the end of the tube 20 as a valve, the rubber washer 21 being adapted to seat snugly against the lower end of the tube 20. The washers 21 and 22 are secured to a stem 23 which is vertically movable on the axis of the cylinder 20. For the purpose of guiding the movement of the stem 23 I mount an apertured bar 24 in the tube 20 with the aperture in alignment with the axis of the tube. Pivotally secured to the lower extremity of the stem 23 is a horizontal arm 25 and at each end of this arm are upright arms 26. At the upper end of each of the arms 26 is a float 27, the floats being mounted so as to be vertically adjustable on the arms.

When the parts thus far described are in place the lower extremity of the tube 20 will be below the surface of the water while the floats 27 will be buoyed up on the surface. As the water is removed by the hogs and the water level falls, the floats 27 will in consequence be lowered and this movement is transmitted to the stem 23, causing the valve to open to permit the passage of water into the trough. The water may be kept automatically at any desired predetermined level by adjusting the floats 27 on their respective arms 26, the ends of these arms being screw-threaded and provided with nuts for holding the floats in adjusted position.

In the larger sizes of fountains and especially in those having considerable depth of water, the buoyancy of the floats is not sufficient to overcome the weight of the water column, with the result that the water trickles out through the valve. In such cases it is necessary to supplement the pressure of the floats to a sufficient degree to overcome the pressure of the water column and to hold the washer 21 tightly pressed against its seat. For this purpose I provide two interfitting screw-threaded caps 28 and 29, the cap 28 being secured to the outside of the tube 20 as shown. Inside the caps and surrounding the stem 23 I mount a coil spring 30 having abutment against the lower end of the cap 29 and against the under surface of the washer 22. I may however vary this arrangement by mounting the spring above the washer 21 so as to cause it to pull that washer into closing position, or I may cause the valve 22 to seat downwardly with a compression spring above the washer to assist in forcing it into its seat.

Bits of straw and other trash entering the reservoir tend to foul the water and to interfere with the automatic valve arrangement if permitted to pass down into the trough 12. To prevent this I secure a ring 31 to the funnel shaped bottom of the reservoir and I provide a filter arrangement which cooperates with the opening in the reservoir. This filter arrangement comprises a ring 32 which is slightly larger in circumference than the ring 31, and a gauze funnel 33 secured to the ring 32. The arrangement is such that a piece of muslin or other suitable material may be stretched flat over the upper surface of the ring 31 and secured by forcing the ring 32 down over it. For facilitating the removal of the filter for cleaning purposes I secure a piece of wire at its ends to diametrically opposite points on the ring 32 and loop it at its upper end, the loop 34 thus serving as a handle.

I have described my invention as of use primarily to furnish a constant supply of drinking water to hogs, but it is apparent that it can be built in smaller sizes for poultry, or in larger sizes with slight modifications for the larger live stock, and I do not desire to restrict the use of my invention to the one described, nor do I desire to relinquish my rights to the equivalents of any of the constructions which I have shown and described.

Having thus described my invention and the manner in which it is used, what I believe to be new and desire to secure by Letters Patent of the United States is:—

A drinking fountain for live stock comprising a cylindrical casing having open ends at its top and bottom and provided with drinking openings in its wall, flared drinking cups secured to the wall adjacent and beneath said openings, a trough connecting said drinking cups, a cylindrical tank suspended in the casing and spaced therefrom throughout its extent, said tank having an open top and a funnel-shaped bottom, an aperture in said funnel-shaped bottom at its lowermost point, a tube passing through said opening and secured to said bottom, said tube projecting into said trough, valve mechanism associated with said tube, a float in said trough and connected with said valve mechanism to automatically control the valve mechanism to maintain the water surface in the trough and drinking cups at a predetermined level, a short tube secured at its lower end in water tight relation to the inner surface of the funnel-shaped bottom with its top on a horizontal level with the top of the first said tube, said short tube being concentric with said first tube, a collar externally slidable on said short tube, a gauze cone secured at its base to said collar, and a looped wire secured at its ends to the collar.

In testimony whereof I affix my signature.

CHARLIE LONG.